(12) United States Patent
Nilsson et al.

(10) Patent No.: US 7,150,506 B2
(45) Date of Patent: *Dec. 19, 2006

(54) CONTROL NETWORK FOR BRAKE SYSTEM

(75) Inventors: Peter Nilsson, Örkelljunga (SE); Anders Lindqvist, Landkrona (SE)

(73) Assignee: Haldex Brake Products AB (SE)

( * ) Notice: Subject to any disclaimer, the term of this patent is extended or adjusted under 35 U.S.C. 154(b) by 0 days.

This patent is subject to a terminal disclaimer.

(21) Appl. No.: 10/673,782

(22) Filed: Sep. 29, 2003

(65) Prior Publication Data

US 2005/0067887 A1 Mar. 31, 2005

(51) Int. Cl.
*B60T 13/66* (2006.01)

(52) U.S. Cl. .................. 303/20; 303/122.04; 303/122; 303/199

(58) Field of Classification Search ............ 303/7, 303/20, 122, 122.04, 122.05, 122.08, 122.03, 303/124, 199; 188/155–161
See application file for complete search history.

(56) References Cited

U.S. PATENT DOCUMENTS

| | | | |
|---|---|---|---|
| 4,653,614 A | 3/1987 | Price et al. | 188/70 |
| 4,852,699 A | 8/1989 | Karnopp et al. | 188/72.2 |
| 4,946,007 A | 8/1990 | Pederson et al. | 188/24.14 |
| 4,974,704 A | 12/1990 | Miller et al. | 188/24.24 |
| 5,012,901 A | 5/1991 | Campbell et al. | 188/71.4 |
| 5,788,023 A | 8/1998 | Schoner et al. | 188/72.7 |
| 5,810,454 A * | 9/1998 | Prinzler et al. | 303/20 |
| 5,829,557 A | 11/1998 | Halasy-Wimmer et al. | 188/162 |
| 5,975,250 A * | 11/1999 | Brandmeier et al. | 188/1.11 W |
| 6,157,887 A * | 12/2000 | Zittlau | 303/122.03 |
| 6,209,966 B1 | 4/2001 | Mies | |
| 6,213,567 B1 * | 4/2001 | Zittlau et al. | 303/20 |
| 6,231,133 B1 * | 5/2001 | Tsukamoto | 303/122.04 |
| 6,318,513 B1 | 11/2001 | Dietrich et al. | 188/72.7 |
| 6,354,671 B1 | 3/2002 | Feldmann et al. | 303/15 |
| 6,410,993 B1 * | 6/2002 | Giers | 303/20 |
| 6,684,146 B1 * | 1/2004 | Hedenetz | 701/70 |
| 6,709,069 B1 * | 3/2004 | Riddiford et al. | 303/20 |
| 6,984,001 B1 * | 1/2006 | Nilsson | 303/20 |
| 2005/0067888 A1 * | 3/2005 | Nilsson | 303/20 |

FOREIGN PATENT DOCUMENTS

WO    WO 03071150    8/2003

* cited by examiner

*Primary Examiner*—Thomas J. Williams
(74) *Attorney, Agent, or Firm*—St. Onge Steward Johnston & Reens

(57) ABSTRACT

An electrically controlled braking system includes at least one control unit and first and second brake component responsive to control signals generated by the control unit. A first control network electrically connects the control unit and the first brake component, and a second control network electrically connects the control unit and the second brake component. An auxiliary control link is activatable to electrically connect the first brake component and the second brake component when a failure occurs in one of the first control network or the second control network, the auxiliary control link adapted to transmit the control signals between the first brake component and the second brake component when the failure occurs.

20 Claims, 3 Drawing Sheets

CONTROL NETWORK FOR BRAKE SYSTEM

FIELD OF THE INVENTION

The present invention relates generally to an electrically controlled braking system which is intended for use with wheeled vehicles, and more particularly to a control network for such a braking system which incorporates enhanced safety features.

BACKGROUND OF THE INVENTION

Traditional braking systems for motor vehicles include conventional hydraulic or pneumatic brakes associated with two or more wheels of the vehicle. Such conventional brakes are actuated by pressurized fluid or compressed air. When actuated, the brakes exert a force on a disk or drum which spins in conjunction with the wheel of the vehicle in order to create frictional forces which resist rotation of the wheel. Traditionally, control signals have been transmitted to each of the brake system's actuators mechanically, or by a hydraulic or pneumatic control circuit. However, it has more recently been proposed to employ a centralized control unit to generate electronic control signals and to use such electronic control signals to control actuation of a vehicle's brakes. This type of electronic control scheme has become even more prevalent in view of modern brake systems which now often include not only conventional hydraulic or pneumatic brake actuator functionality, but also supplemental electronic functions such as antilock protection (ABS) and/or electronic braking force distribution (EBV) between the front and rear axles.

U.S. Pat. No. 6,354,671 discloses a brake system in which electronic signals are used to at least partially control actuation of a vehicle's brakes. However, as recognized in the patent, brake system failure due to failure of the electronic control unit is a significant risk. As such, system redundancy is provided in the form of a back-up pneumatic control circuit. Should the electronic control unit malfunction, the braking system is controlled by the back-up pneumatic control circuit in much the same way as traditional brake systems operate. However, such a system suffers from a number of disadvantages. Providing a back-up pneumatic control circuit greatly complicates the braking system and increases the costs thereof. Moreover, when operating in the back-up mode, the advanced functionality of the electronic control system is lost. As such, providing a pneumatic back-up system defeats many of the advantages of providing an electronic control circuit in the first place.

U.S. Pat. No. 6,209,966 obviates some of the problems associated with providing a back-up pneumatic control circuit by employing two electronic control units, which operate independently of each other, and which provide control signals to a brake cylinder assigned to a wheel and a braking pressure modulator valve which is fluid-connected to the brake cylinder. The braking pressure modulator has a first electric actuating element, which can be activated by a first of the two control units, and a second electric actuating element which acts in the same direction when activated as the first electric actuating element. The second electric actuating element can be activated by the second electronic control unit at the same time as the first electric actuating element is being activated by the first electronic control unit. Thus, system redundancy is provided by providing two separate electronic control units, each of which controls one of two separate electric actuating elements associated with each wheel.

While U.S. Pat. No. 6,209,966 obviates some of the problems associated with providing a back-up pneumatic control circuit, it suffers from disadvantages of its own. The braking system disclosed in the '966 patent would require two separate electronic actuating elements associated with each wheel. This requirement, however, needlessly complicates and increases the cost of the system. This is true because control problems, when they arise, are generally caused by a malfunction in the control unit and/or the control network by which control signals are transmitted to the actuating elements, not by failure of the actuating elements themselves. As such, providing two actuating elements for each wheel would not significantly enhance safety of the braking system. Moreover, because both electronic control networks (i.e., the control networks associated with each electronic control unit) are directly connected to actuating elements at each wheel, it is possible for an external catastrophic event, such as a tire explosion, in the vicinity of one of the wheels to cut the network cabling and/or cause a short-circuit in both control networks, thereby causing the entire brake system to fail.

It has also been suggested to create a redundant electronic control system where two separate control networks are employed. Such a system 100, shown in FIG. 1, employs one or more central control units 102 provided to control two or more brake assemblies 104, 106, 108, 110, 112, 114, each having a brake actuator 116 incorporating an electronic control unit 118. Central control unit or units 102 is or are in electrical communication with the electronic control unit 118 of each of brake assemblies 104, 106, 108, 110, 112, 114 via at least two electronic control networks 120, 122. As seen in FIG. 1, all of electronic control units 118 of all brake assemblies 104, 106, 108, 110, 112, 114 are connected to each electronic control network 120, 122. By providing such an arrangement, should one electronic control network fail, the other electronic control network would theoretically maintain control of all brake assemblies.

However, this arrangement suffers from disadvantages similar to those suffered by U.S. Pat. No. 6,209,966 discussed above. More specifically, because both electronic control networks 120, 122 are directly electrically connected to electronic control units 118 of all brake assemblies 104, 106, 108, 110, 112, 114, it is possible for an external catastrophic event, such as a tire explosion, in the vicinity of one of the brake assemblies to cut the network cabling and/or cause a short-circuit in both control networks 120, 122, thereby causing the entire brake system to fail.

What is desired, therefore, is an electrically controlled braking system which is intended for use with wheeled vehicles, which incorporates enhanced safety features, which employs system redundancy in case of partial system failure, which is relatively uncomplicated and less costly as compared to known systems, and which is not prone to complete system failure in the case of an external catastrophic event.

SUMMARY OF THE INVENTION

Accordingly, it is an object of the present invention to provide an electrically controlled braking system which is intended for use with wheeled vehicles.

Another object of the present invention is to provide an electrically controlled braking system having the above characteristics and which incorporates enhanced safety features.

A further object of the present invention is to provide an electrically controlled braking system having the above characteristics and which employs system redundancy in case of partial system failure.

Still another object of the present invention is to provide an electrically controlled braking system having the above characteristics and which is relatively uncomplicated and less costly as compared to known systems.

Yet a further object of the present invention is to provide an electrically controlled braking system having the above characteristics and which is not prone to complete system failure in the case of an external catastrophic event.

These and other objects of the present invention are achieved in one embodiment by provision of an electrically controlled braking system having at least one control unit, the at least one control unit generating control signals. The system also includes a first brake component responsive to the control signals generated by the at least one control unit and a second brake component responsive to the control signals generated by the at least one control unit. A first control network electrically connects the at least one control unit and the first brake component, the first control network adapted to transmit the control signals from the at least one control unit to the first brake component. A second control network electrically connects the at least one control unit and the second brake component, the second control network adapted to transmit the control signals from the at least one control unit to the second brake component. An auxiliary control link is activatable to electrically connect the first brake component and the second brake component when a failure occurs in one of the first control network or the second control network, the auxiliary control link adapted to transmit the control signals between the first brake component and the second brake component when the failure occurs.

In some embodiments, the at least one control unit comprises two control units, wherein one of the two control units is electrically connected to the first control network, and wherein another of the two control units is electrically connected to the second control network. In other embodiments, the at least one control unit comprises a single control unit, and wherein the single control unit is electrically connected to both the first control network and the second control network. In still other embodiments, the at least one control unit comprises two control units, and wherein each of the two control units is electrically connected to both the first control network and the second control network.

In some embodiments, the brake system further comprises a third brake component responsive to the control signals generated by the at least one control unit, the third brake component electrically connected to the first control network, and a fourth brake component responsive to the control signals generated by the at least one control unit, the fourth brake component electrically connected to the second control network. In these embodiments, a second auxiliary control link is activatable to electrically connect the third brake component and the fourth brake component when a failure occurs in one of the first control network or the second control network, the second auxiliary control link adapted to transmit the control signals between the third brake component and the fourth brake component when the failure occurs.

In certain of these embodiments, the braking system further comprises a fifth brake component responsive to the control signals generated by the at least one control unit, the fifth brake component electrically connected to the first control network, and a sixth brake component responsive to the control signals generated by the at least one control unit, the sixth brake component electrically connected to the second control network. In these embodiments, a third auxiliary control link is activatable to electrically connect the fifth brake component and the sixth brake component when a failure occurs in one of the first control network or the second control network, the third auxiliary control link adapted to transmit the control signals between the fifth brake component and the sixth brake component when the failure occurs.

In some embodiments, each of the first brake component and the second brake component comprises a brake actuator comprising an electrical control unit. In some embodiments, the first brake component and the second brake component are actuated by a force selected from the group consisting of an electrical force, a hydraulic force, a pneumatic force and combinations of these. In some embodiments, the first brake component and the second brake component are disposed on a common axle of a vehicle.

In some embodiments, the at least one control unit further controls functions a vehicle system selected from the group consisting of an antilock brake system, an electronic braking force distribution system, a vehicle suspension system, a dynamic stability system and combinations of these. In some embodiments, the control signals to which both the first brake component and the second brake component are responsive are transmitted over both the first control network and the second control network.

In another embodiment of the present invention, an electrically controlled braking system comprises at least one control unit, the at least one control unit generating control signals, and a plurality of pairs of brake components, each of the brake components responsive to the control signals generated by the at least one control unit. A first control network electrically connects the at least one control unit and a first brake component of each pair of brake components, the first control network adapted to transmit the control signals from the at least one control unit to the first brake component of each pair of brake components. A second control network electrically connects the at least one control unit and a second brake component of each pair of brake components, the second control network adapted to transmit the control signals from the at least one control unit to the second brake component of each pair of brake components. A plurality of auxiliary control links are activatable to electrically connect the first brake component of each pair of brake components and the second brake component of each pair of brake components when a failure occurs in one of the first control network or the second control network, the auxiliary control links adapted to transmit the control signals between the first brake component of each pair of brake components and the second brake component of each pair of brake components when the failure occurs.

In some embodiments, the at least one control unit comprises two control units, wherein one of the two control units is electrically connected to the first control network, and wherein another of the two control units is electrically connected to the second control network. In other embodiments, the at least one control unit comprises a single control unit, and wherein the single control unit is electrically connected to both the first control network and the second control network. In still other embodiments, the at least one control unit comprises two control units, and wherein each of the two control units is electrically connected to both the first control network and the second control network.

In some embodiments, each of the brake components comprises a brake actuator comprising an electrical control unit. In some embodiments, each of the brake components is actuated by a force selected from the group consisting of an electrical force, a hydraulic force, a pneumatic force and combinations of these. In some embodiments, each pair of brake components is disposed on a common axle of a vehicle.

In some embodiments, the at least one control unit further controls functions a vehicle system selected from the group consisting of an antilock brake system, an electronic braking force distribution system, a vehicle suspension system, a dynamic stability system and combinations of these. In some embodiments, control signals to which each of the brake components is responsive are transmitted over both the first control network the said second control network.

The invention and its particular features and advantages will become more apparent from the following detailed description considered with reference to the accompanying drawings.

DETAILED DESCRIPTION OF AN EMBODIMENT OF THE INVENTION

Figure 1:
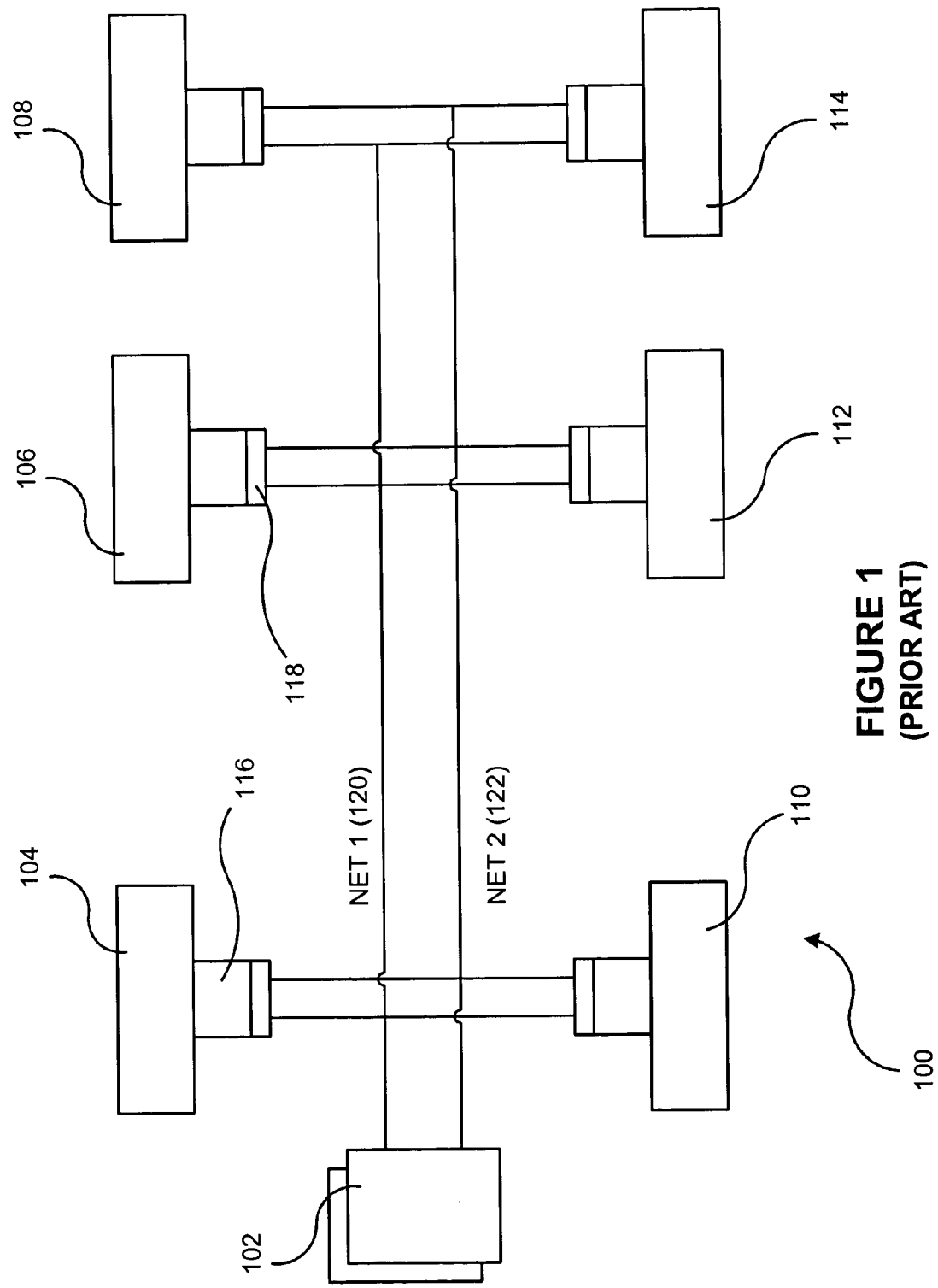
FIG. 1 is a schematic view of an electrically controlled braking system in accordance with a known prior art design.
Figure 2:
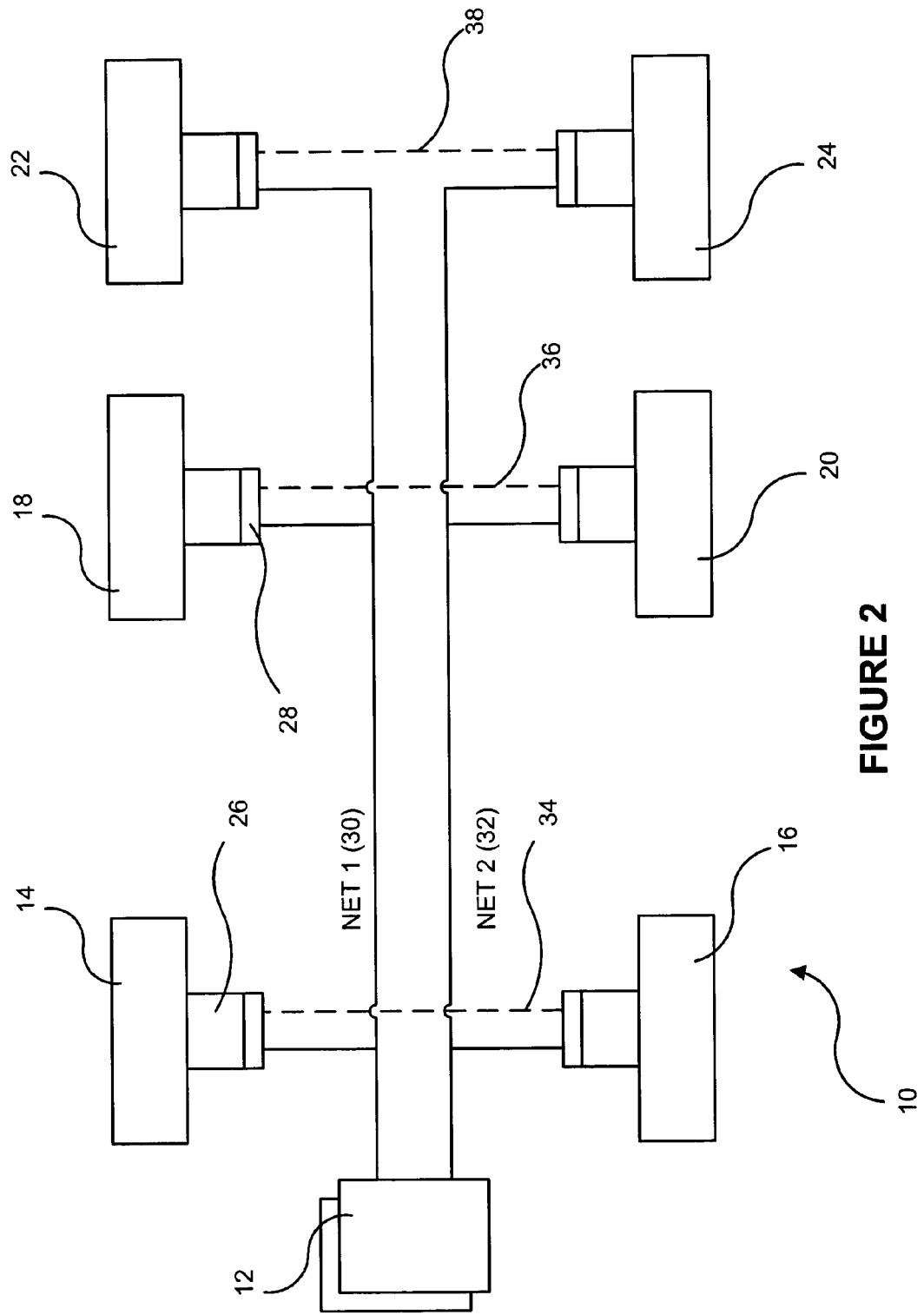
FIG. 2 is a schematic view of an electrically controlled braking system in accordance with an embodiment of the present invention.

Referring to FIG. 2, an electrically controlled braking system 10 in accordance with the present invention is shown. Braking system 10 includes at least one control unit 12 which generates control signals. Braking system 10 also includes a plurality of brake components 14, 16, 18, 20, 22, 24. While six brake components 14, 16, 18, 20, 22, 24 are shown in FIG. 2, it should be understood that braking system 10 may include a greater or lesser number of brake components. It is desirable, although not strictly necessary, that an even number of brake components are provided, and that the brake components are treated as pairs. For example, the brake components associated with the pair of wheels on each axle may be treated as a pair. In FIG. 2, first brake component 14 is paired with second brake component 16, third brake component 18 is paired with fourth brake component 20, and fifth brake component 22 is paired with sixth brake component 24.

Each of brake components 14, 16, 18, 20, 22, 24 is responsive to the control signals generated by control unit(s) 12. More particularly, each of brake components 14, 16, 18, 20, 22, 24 includes a brake actuator 26 incorporating an electronic control unit 28 which electronic control unit 28 causes brake actuator 26 to operate in response to the control signals. As such electronically controllable brake components are known in the art, a detailed discussion of the operation thereof is not presented herein. Each of brake components 14, 16, 18, 20, 22, 24 may be actuated by electrical force, hydraulic force, pneumatic force, combinations of these, and/or by any other appropriate force.

Braking system 10 includes at least two control networks for transmitting control signals from control unit(s) 12 to each of brake components 14, 16, 18, 20, 22, 24, with some of brake components 14, 16, 18, 20, 22, 24 being electrically connected to control unit(s) 12 via one control network and others of brake components 14, 16, 18, 20, 22, 24 being electrically connected to control unit(s) 12 via another or other control network(s). Preferably, each one of each pair of brake components is connected to a different control network.

In braking system 10 shown in FIG. 2, two control networks 30, 32 are provided. First control network 30 electrically connects control unit(s) 12 with first brake component 14, third brake component 18 and fifth brake component 22 (i.e., one of each pair of brake components). First control network 30 is adapted to transmit the control signals from control unit(s) 12 to first brake component 14, third brake component 18 and fifth brake component 22. Second control network 32 electrically connects control unit(s) 12 with second brake component 16, fourth brake component 20 and sixth brake component 24 (i.e., the other one of each pair of brake components not electrically connected to first control network 30). Second control network 32 is adapted to transmit the control signals from control unit(s) 12 to second brake component 16, fourth brake component 20 and sixth brake component 24.

It is desirable that no brake component is directly electrically connected to both of first control network 30 and second control network 32. This is true so as to reduce the likelihood that an external catastrophic event, such as a tire explosion, in the vicinity of one of the brake components cut the network cabling and/or causes a short-circuit in both control networks 30, 32, thereby causing the entire brake system 10 to fail. For example, an external catastrophic event occurring in the vicinity of first brake component 14 may cause damage to first control network 30, thereby causing first control network 30 to be shorted and fail. However, because second control network 32 is not directly electrically connected to first brake component 14, such an external catastrophic event likely would not cause damage to second control network 32, and second control network 32 would still function.

Brake system 10 also includes auxiliary control links between each of the pairs of brake components, which auxiliary control links are activatable to electrically connect the pairs of brake components when a failure occurs in one of the control networks 30, 32. The auxiliary control links are adapted to transmit the control signals between each of the brake components forming each pair of brake components when such a failure occurs. In the embodiment shown in FIG. 2, three such auxiliary control links 34, 36, 38 are shown. First auxiliary control link 34 electrically connects first brake component 14 and second brake component 16, second auxiliary control link 36 electrically connects third brake component 18 and fourth brake component 20, and third auxiliary control link 38 electrically connects fifth brake component 22 and sixth brake component 24.

It should be recognized that for system 10 to properly function, control signals for all brake components 14, 16, 18, 20, 22, 24 should be transmitted over both control networks 30, 32, not just the control signals for the brake components directly connected to each individual control network 30, 32. For example, although first brake component 14 is not directly connected to second control network 32, the control signals for first brake component 14 should be transmitted over second control network 32, so that in the event of a failure of first control network 30 (to which first brake component 14 is attached), control signals may be transmitted to first brake component 14 through second control network 32 and second brake component 16 via first auxiliary control link 34.

Thus, as discussed in the above example, suppose that an external catastrophic event occurs in the vicinity of first brake component 14 which causes damage to first control network 30, thereby causing first control network 30 to be shorted and/or fail. Because second control network 32 is not directly electrically connected to first brake component 14, such an external catastrophic event likely would not cause damage to second control network 32, and second control network 32 would still function. Since first brake component 14 would no longer be receiving control signals through first control network 30, first auxiliary control link 34 would attempt to supply control signals to first brake component 14 from second brake component 16. Of course, due to the hypothetical external catastrophic event, first brake component 14 may be damaged or destroyed and not function properly, and/or first auxiliary control link 34 may be damaged. Thus, first brake component 14 may not be operational. However, third brake component 18 and fifth brake component 22 are likely not damaged—they are simply no longer receiving control signals through the failed first control network 30. As such, control signals supplied to third brake component 18 and fifth brake component 22 from fourth brake component 20 and sixth brake component 24 through second auxiliary control link 36 and third auxiliary control link 38 respectively could be used to control third brake component 18 and fifth brake component 22.

Thus, system redundancy is provided, while at the same time isolation of the control networks 30, 32 from one another is maintained by providing connection between brake components on different control networks 30, 32 by way of a buffer (i.e., auxiliary control links 34, 36, 38). Thus, it is extremely unlikely that both control networks 30, 32 will fail. At the same time, if one of them does fail, control of at least some of the brake components on the failed control network can still be maintained.

In some cases, it may be desirable for two control units 12 to be provided. When such is the case, one of control units 12 may be electrically connected to first control network 30, while the other of control units 12 may be electrically connected to second control network 32. Alternatively, in order to maintain true redundancy (for example, if one of control units 12 fails), each of the two control units 12 may be electrically connected to both control networks 30, 32. In other cases, it may be desirable for a single control unit 12 to be provided, which control unit 12 may be electrically connected to both control networks 30, 32. Of course, in any case where control unit(s) 12 is/are connected to both control networks 30, 32, it would be desirable to provide control unit(s) 12 with safeguard measures to ensure that shorting or other failure of one control network 30, 32 does not short or otherwise cause a failure of the entire control unit(s) 12.

In addition to controlling standard braking operations, control unit(s) 12 may control various additional braking functions, such as antilock brake systems (ABS) and electronic braking force distribution (EBV) systems, as well as other vehicle systems, such as vehicle suspension and dynamic stability systems.

Figure 3:
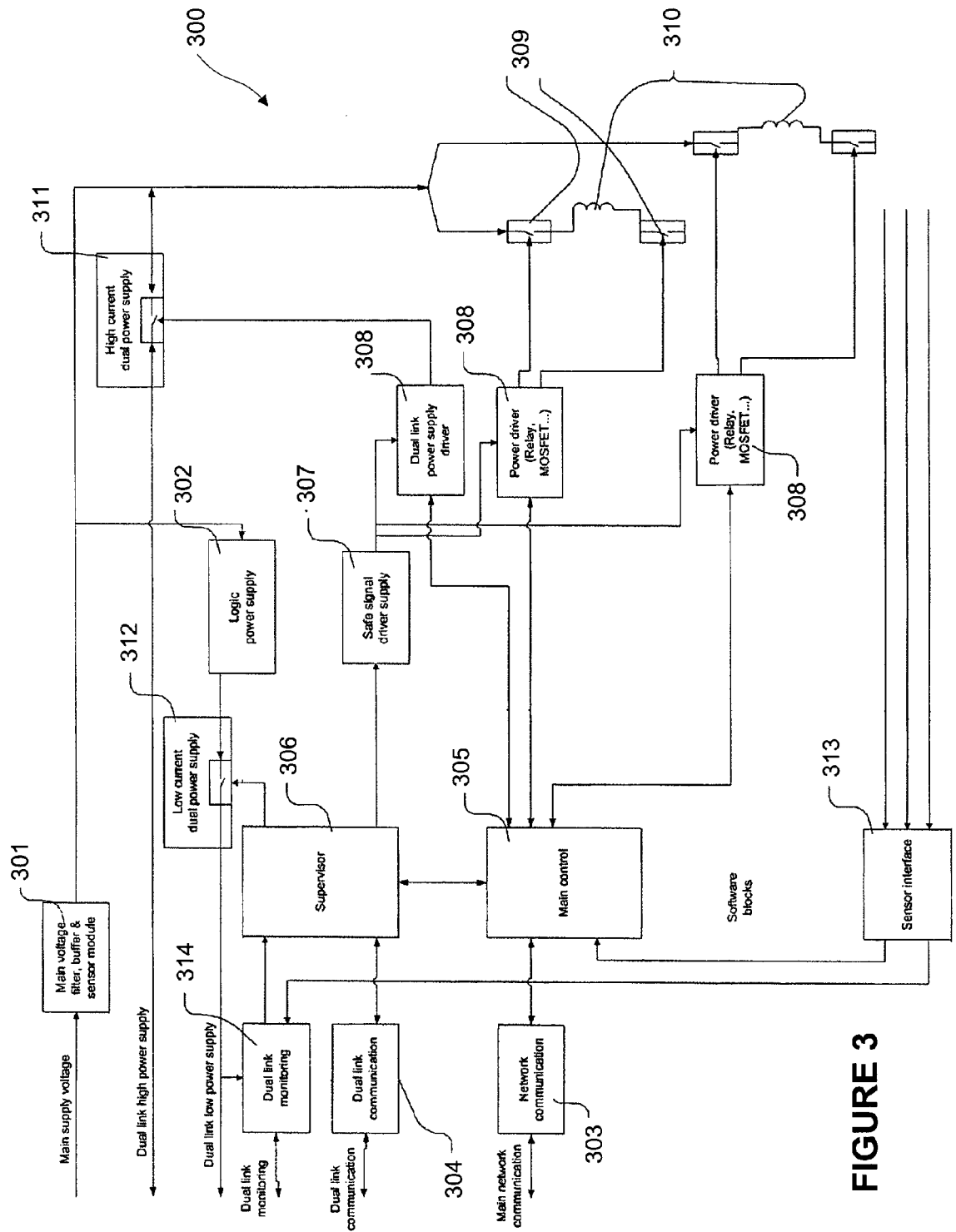
FIG. 3 is a schematic view illustrating in more detail certain aspects of a particular embodiment of how the electrically controlled braking system of FIG. 2 may be implemented.

Referring now to FIG. 3, an embodiment of how the system 10 of FIG. 2 may be implemented is shown. More specifically, a "dual link" system is based upon the concept of treating the brake components of each axle as a pair. The term "dual link" refers to the connection between the left and right side brake actuator in this pair. The dual link is applicable for power supply, digital communication and single/multiple sensor information. The design of the local electronics according to one embodiment of a dual link system 300 is shown in FIG. 3.

The dual link system 300 at a local level may provide a safe switch on function of the secondary supply voltage. Switch on (with a bi-directional switch or dual unidirectional switches) is to be determined by the software in both brake units in the axle pair. The low current dual link power supply is optional and intended to supply a redundant supply to the microcontrollers in both brake units with at least single (but preferably double) protection to avoid the risk of a common short-circuit to be catastrophic for both brake units. With this dual supply, the software in a brake unit losing primary battery supply voltage will not be disturbed and the switchover time will be short. With a hardware battery supply detection activated and monitored by the software, the switchover time will be essentially zero. The switch on of the secondary supply and of safety critical electromechanical devices shall not occur for a single fault in software or hardware. At least two switches in serial connection to each device are used to avoid one short-circuit failure destroying the switch off function. At least two independent software activations are necessary to activate any of these functions. First, the supervisor module supplies the power driver supply, through the safe signal driver supply (toggling at specified frequency), with a software generated signal. A common signal provides activations for all power drivers. For safety critical designs supervisory functions require that the supervisory (watchdog) function use a separate clock circuit. The supervisor module in this case may use the clock of the other brake unit of the axle pair as this second clock source through the dual link communication. Second, the main control module controls the power driver with a direct signal to the input pins of the power driver.

The dual link communication may also be used (1) to transfer brake system network information to the brake unit in the axle pair that has lost the connection to the brake system network, (2) to perform crosschecking of the timing (see above) and decision making for the supervisory function, (3) to transfer information regarding the power supply status of the brake units for the decision when to supply battery power across the dual link power supply, and/or (4) to transfer status information at high speed across the axle pair to be used when the communication to one brake unit is lost. This information will be helpful for the brake system to decide what actions to be taken by the other brake units when communication to a single brake unit is lost. The dual link monitoring is an optional way to determine the status of a failed brake unit from a sensor of a critical condition of the failed brake unit. The sensor could be at least one of temperature, clamping force, frictional force, brake torque, wheel speed or any other signal of great safety critical importance. The sensor will be supplied through the dual link low power supply which is necessary for this option. This option is intended to increase the possibility to continue driving a vehicle with a brake system with a failed brake unit by monitoring at least one critical condition of a failed brake unit through the dual link monitoring.

The components of system 300 are now described in more detail. Primary battery supply voltage filter, buffer and monitor module 301 provides energy buffering (e.g., by inclusion of capacitors), EMI-filtering, load current monitoring and/or load current limitation. Module 301 may also provide reverse battery protection if requested by the power supply system, although a perhaps better solution is a fixed cabling system not allowing the user to reverse the battery connection to the individual brake unit. Logic power supply module 302 supplies voltage for the internal logic and analog functions (including sensors) of system 300, supplies voltage to communication interfaces, and/or provides short-circuit protection of each output supply.

Brake system network communication module 303 provides network communication with other units in the brake system and/or with the vehicle systems, while dual link communication module 304 provides communication across the axle pair (i.e., left side actuator to right side actuator), including monitoring, crosschecking and watchdog functionality and/or transfers brake networking communication when one actuator in the pair has lost the communication to/from the brake system network.

Main control module 305 provides the main control strategy for the brake unit responding to the inputs from brake system network, dual link communication and sensor information connected to the electronic unit. Supervisor module 306 transfers information from the dual link communication module 304 to the main control module 305 and/or performs a watchdog function comparing information from the main control module 305 and the dual link communication module 304. If the watchdog function accepts the timing and information received according to the rules specified by design a software driven safe signal is sent out from the supervisor module 306. The existence of this signal is necessary to activate the power driver supply voltage from the safe signal driver supply module 307 described below. A safe signal is defined as a digital signal changing from toggling between 0 and 1 at a specified frequency.

Safe signal driver supply module 307 supplies a voltage to the power drivers 308 if and only if the safe signal from the supervisor module 306 is according to the specified frequency and timing. The supply voltage energy is supplied through an analog bandpass filter function. The safe signal driver supply voltage will supply voltage to the power drivers 308 as described below.

The power drivers 308 are the buffer drivers used to control the high power switches 309 (switches can be MOSFET transistor, relay and similar). Without a supply voltage the power drivers 308 are not able to switch on any high power switch 309. The safe signal driver supply voltage is the supply voltage to these units. The power drivers 308 are controlled by a logic signal from the main control module 305. To switch on a high power switch 309 both the on signal from the main control module 305 and the safe signal driver supply voltage is needed.

High power switches 309 are used to control electromechanical devices 310 controlling the function of the brake actuator. The status of the high power switches 309 is constantly monitored in order to detect a short-circuit failure. If the electromechanical device has a safety-critical function the winding/windings to this device are controlled by at least two high power switches (as shown in FIG. 3). This redundancy guarantees that the electromechanical device 310 is able to be switched through the high power switches 309 even if there is a single failure in a high power switch 309. The decision to switch off to a fail-safe state is taken either by the main control module 305 or the supervisor module 306 thorough the safe signal to the power driver supply module 307. Electromechanical devices 310 are in fail-safe condition with no current in the windings.

High current dual link power supply module 311 includes at least one of the following features: current monitoring of the current flow in the dual link high power supply; current limitation; voltage monitoring of the brake on the other side; and a high power switch of the power supply from the primary supply battery voltage to the dual link high power supply connection to the brake unit on the other side of the axle pair. The switch is normally off, and may comprise either one bidirectional switch, one uni-directional switch or two unidirectional switches (one in each direction). The decision as to when to switch on the switch/switches can be totally controlled from software, totally controlled from hardware monitoring or a combination of hardware and software decision.

Low current dual link power supply 312 includes at least one of the following features: a bi-directional switch of the power supply from the logic supply voltage to the dual link low power supply connection to the brake unit on the other side of the axle pair (which bi-directional switch is normally on); current monitoring of the current flow in the dual link low power supply; and current limitation. The dual link low power supply supplies a second source of power to at least one of the following functions in the brake unit on the other side of axle pair: the core of the main control function; the dual link interface; and, sensors and hardware signal condition to these sensors that are of importance at a loss of functionality.

Sensor interface module 313 provides hardware and/or software conditioning of sensor signals from at least one of motor position, motor velocity, clamping force, friction force, temperature, brake torque, wheel speed, tire pressure, motor and electromagnet current, etc. Dual link monitoring module 314 monitors information from the brake unit at the other side of the axle pair at a loss of functionality, including the dual link communication in that other brake unit. The information is used to determine what the brake system shall and can do to keep the vehicle safe and stable on the road in the case of a failure of a single brake unit.

The present invention, therefore, provides an electrically controlled braking system which is intended for use with wheeled vehicles, which incorporates enhanced safety features, which employs system redundancy in case of partial system failure, which is relatively uncomplicated and less costly as compared to known systems, and which is not prone to complete system failure in the case of an external catastrophic event.

Although the invention has been described with reference to a particular arrangement of parts, features and the like, these are not intended to exhaust all possible arrangements or features, and indeed many other modifications and variations will be ascertainable to those of skill in the art.

What is claimed is:

1. An electrically controlled braking system comprising:
   at least one control unit, said at least one control unit generating control signals indicative of demand for braking;
   a first brake component responsive to the control signals generated by said at least one control unit;
   a second brake component responsive to the control signals generated by said at least one control unit;
   a first control network electrically connecting said at least one control unit and said first brake component, said first control network adapted to transmit the control signals from said at least one control unit to said first brake component;
   a second control network electrically connecting said at least one control unit and said second brake component, said second control network adapted to transmit the control signals from said at least one control unit to said second brake component; and an auxiliary control link electrically connecting said first brake component and said second brake component, said auxiliary control link adapted to transmit the control signals, after the control signals have been received by one of said first brake component and said second brake component, from the one of said first brake component and said second brake component that received the control signals to the other one of said first brake component and said second brake component when a failure occurs in one of said first control network or said second control network.

2. The braking system of claim 1 wherein said at least one control unit comprises two control units, wherein one of said two control units is electrically connected to said first control network, and wherein another of said two control units is electrically connected to said second control network.

3. The braking system of claim 1 wherein said at least one control unit comprises a single control unit, and wherein the single control unit is electrically connected to both said first control network and said second control network.

4. The braking system of claim 1 wherein said at least one control unit comprises two control units, and wherein each of the two control units is electrically connected to both said first control network and said second control network.

5. The braking system of claim 1 further comprising:
a third brake component responsive to the control signals generated by said at least one control unit, said third brake component electrically connected to said first control network;
a fourth brake component responsive to the control signals generated by said at least one control unit, said fourth brake component electrically connected to said second control network; and
a second auxiliary control link electrically connecting said third brake component and said fourth brake component, said second auxiliary control link adapted to transmit the control signals received by one of said third brake component and said fourth brake component to the other one of said third brake component and said fourth brake component when the failure occurs.

6. The braking system of claim 5 further comprising:
a fifth brake component responsive to the control signals generated by said at least one control unit, said fifth brake component electrically connected to said first control network;
a sixth brake component responsive to the control signals generated by said at least one control unit, said sixth brake component electrically connected to said second control network; and
a third auxiliary control link electrically connecting said fifth brake component and said sixth brake component, said third auxiliary control link adapted to transmit the control signals received by one of said fifth brake component and said sixth brake component to the other one of said fifth brake component and said sixth brake component when the failure occurs.

7. The braking system of claim 1 wherein each of said first brake component and said second brake component comprises a brake actuator comprising an electrical control unit.

8. The braking system of claim 1 wherein said first brake component and said second brake component are actuated by a force selected from the group consisting of an electrical force, a hydraulic force, a pneumatic force and combinations of these.

9. The braking system of claim 1 wherein said first brake component and said second brake component are disposed on a common axle of a vehicle.

10. The braking system of claim 1 wherein said at least one control unit further controls functions a vehicle system selected from the group consisting of an antilock brake system, an electronic braking force distribution system, a vehicle suspension system, a dynamic stability system and combinations of these.

11. The braking system of claim 1 wherein control signals to which both said first brake component and said second brake component are responsive are transmitted over both said first control network and said second control network.

12. An electrically controlled braking system comprising:
at least one control unit, said at least one control unit generating control signals indicative of demand for braking;
a plurality of pairs of brake components, each of said brake components responsive to the control signals generated by said at least one control unit;
a first control network electrically connecting said at least one control unit and a first brake component of each pair of brake components, said first control network adapted to transmit the control signals from said at least one control unit to the first brake component of each pair of brake components;
a second control network electrically connecting said at least one control unit and a second brake component of each pair of brake components, said second control network adapted to transmit the control signals from said at least one control unit to the second brake component of each pair of brake components; and
a plurality of auxiliary control links electrically connecting the first brake component of each pair of brake components and the second brake component of each pair of brake components, said auxiliary control links adapted to transmit the control signals, after the control signals have been received by one of the first brake component of each pair of brake components and the second brake component of each pair of brake components, from the one of the first brake component of each pair of brake components and the second brake component of each pair of brake components that received the control signals to the other one of the first brake component of each pair of brake components and the second brake component of each pair of brake components when a failure occurs in one of said first control network or said second control network.

13. The braking system of claim 12 wherein said at least one control unit comprises two control units, wherein one of said two control units is electrically connected to said first control network, and wherein another of said two control units is electrically connected to said second control network.

14. The braking system of claim 12 wherein said at least one control unit comprises a single control unit, and wherein the single control unit is electrically connected to both said first control network and said second control network.

15. The braking system of claim 12 wherein said at least one control unit comprises two control units, and wherein each of the two control units is electrically connected to both said first control network and said second control network.

16. The braking system of claim 12 wherein each of the brake components comprises a brake actuator comprising an electrical control unit.

17. The braking system of claim 12 wherein each of said brake components is actuated by a force selected from the group consisting of an electrical force, a hydraulic force, a pneumatic force and combinations of these.

18. The braking system of claim 12 wherein each pair of brake components is disposed on a common axle of a vehicle.

19. The braking system of claim 12 wherein said at least one control unit further controls functions a vehicle system selected from the group consisting of an antilock brake system, an electronic braking force distribution system, a vehicle suspension system, a dynamic stability system and combinations of these.

20. The braking system of claim 12 wherein control signals to which each of said brake components is responsive are transmitted over both said first control network and said second control network.

* * * * *